March 19, 1957  J. ZUERCHER  2,785,898
BALL AND PIN HANDLING MECHANISM FOR
BOWLING PIN SPOTTING MACHINES
Filed May 11, 1953  3 Sheets-Sheet 3

INVENTOR
JOHN ZUERCHER
BY
ATTORNEY

United States Patent Office 2,785,898
Patented Mar. 19, 1957

2,785,898

BALL AND PIN HANDLING MECHANISM FOR BOWLING PIN SPOTTING MACHINES

John Zuercher, Buffalo, N. Y., assignor to American Machine & Foundry Company, a corporation of New Jersey Application May 11, 1953, Serial No. 354,265

8 Claims. (Cl. 273—43)

This invention relates to the game of bowling, and more particularly to mechanism for handling and conveying pins in the pit of a bowling alley.

The mechanism constituting the invention is particularly adaptable for use with bowling pin spotting machines because it makes possible such handling of pins and balls that jams of pins in the pit of an alley adjacent to and beneath the backstop are prevented, and balls can be separated readily from pins for delivery of pins to a pinspotter, and balls to a player, respectively.

Attempts have been made in the prior art to facilitate the handling of pins and balls in the pit of a bowling alley, and especially with bowling pin spotting machines where it is desirable that pins and balls be separated not only for expediting the return of balls to the player, but also in facilitating and speeding up the handling of pins and their delivery to pin spotting mechanism. One of the problems is to prevent jamming of pins, and pins and balls in front of and beneath the backstop or cushion after the pins and balls fall into the pit. Because of the shape of pins which generally are delivered or drop into the pit in various positions and arrangements, such attempts to solve these problems have not proven to be satisfactory.

The present invention solves the above noted problems because it provides means for positively preventing jamming and tangling of pins or obstructing pin movement by "sleepers," such that pins are free to move freely to the rear of the pit for delivery into pin handling means. Also the invention provides mechanism for effectively separating balls from pins such that balls can be delivered expeditiously to a suitable ball return device and returned to the player.

In a preferred form of the present invention, there is provided in the pit of a bowling alley an endless conveyor, such as an endless belt which is pit wide and extends substantially the full length of the pit. The endless belt thus has a bowling object receiving portion adjacent the header board or end of the alley, and a discharge portion at the rear of the backstop or cushion. Operatively associated with the endless belt, which preferably is driven continuously, is a belt agitating device, such as an eccentrically mounted roller which may be driven continuously by its engagement with the under surface of the top lap of the endless conveyor belt. This roller is located slightly in front of the backstop or cushion and its rotation causes the endless conveyor pin and ball supporting lap to move rapidly up an down. This action effectively agitates pins lying on the surface thereof and prevents them from jamming or tangling beneath the backstop or adjacent thereto. It also insures that there will be no "sleepers" lying along the sides of the kickbacks of the alley.

Also coacting with the endless conveyor belt and eccentric roller is a transversely extending buffer board located beneath the pin and ball supporting lap of the endless belt conveyor. This buffer board is mounted on resilient supports such that when pins and a ball drop into the pit or strike the belt conveyor moving over the buffer board, the latter absorbs the shock of impact and thus minimizes to a marked extent wear and tear on the belt, thereby resulting in longer belt life. In a preferred form of the invention, the resilient supports at one side of the pit are located higher than at the other side. This arrangement causes balls to roll towards the lower side of the buffer board and thereby be directed more rapidly to a suitable ball removing device which can be provided to remove balls from the pit and return them to the player.

In order to insure that the belt at all times will be properly centered in the pit, and to prevent excess wear of the edges thereof, one of the rollers which supports the belt for movement, is of the self-aligning or centering type.

It is an object of the invention to provide improved mechanism for handling balls and pins in the pit of a bowling alley, and for separating pins from balls and preventing jams of pins in the pit.

It is a further object of the invention to provide improved pin and ball handling means for use in the pit of a bowling alley consisting of a pit wide longitudinally extending pin and ball conveyor located in the pit of an alley and having means associated therewith for agitating or vibrating limited portions of the pin and ball supporting lap thereof so as to prevent jams of pins on the pin and ball supporting lap such that pins can move freely beneath the backstop, and the backstop will hold back the ball which is separated thereby from the pins and directed by the backstop and the conveyor to ball removing and returning means.

The invention is further characterized by the provision of an endless belt pin and ball pit conveyor and means associated therewith for preventing excess wear of the belt and also for agitating or vibrating a limited portion of the belt to insure the unobstructed movement of pins beneath the backstop.

The invention also consists in the provision of a novel pin and ball handling mechanism in which an endless pit wide belt extending substantially the full length of the pit has associated therewith means for insuring its centered relationship in the pit at all times and means for moving limited portions of the belt so as to insure the free and unobstructed movement of pins beneath the backstop, or rearwardly in the pit.

The invention is further characterized by the provision of an endless conveyor, preferably continuously driven mounted in the pit of a bowling alley, and extending substantially the full length of the pit and transversely thereacross between the kickbacks of a bowling alley, and an eccentric agitating roller located beneath the upper lap of the conveyor and driven thereby at a relatively rapid rate of rotation, operative to agitate the conveyor and break up sleepers and jams of pins in the pit, thus insuring the free movement of pins in separated arrangement to the rear of the pit where they are delivered to suitable pin handling mechanisms.

With these and other objects not specifically mentioned in view, the invention consists in certain combinations and constructions which will be described fully hereinafter, and then set forth in the claims hereunto appended.

In the accompanying drawings, which form a part of this specification and illustrate a preferred embodiment of the invention and in which like characters of reference indicate the same or like parts:

Figure 1:
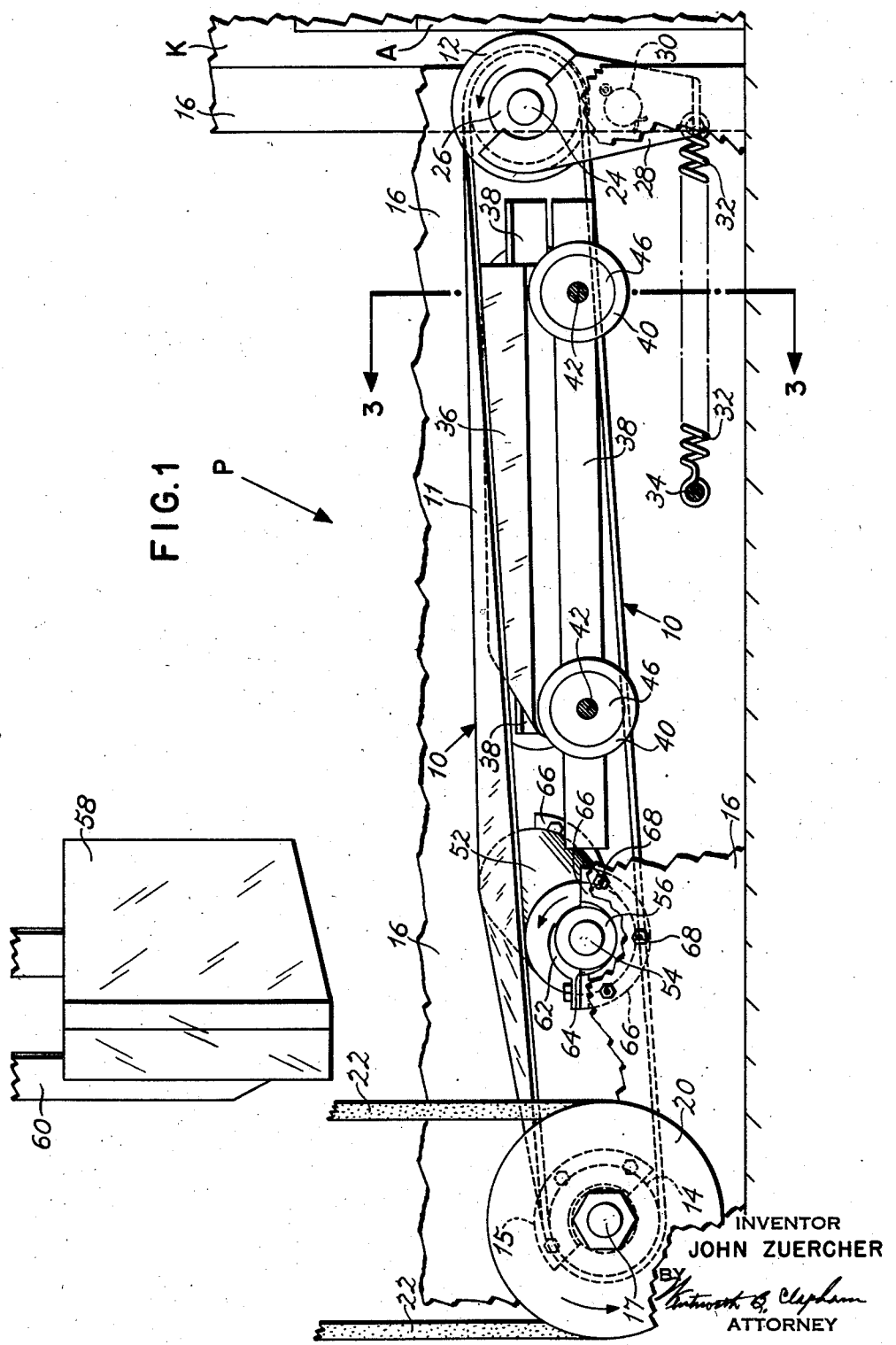
Fig. 1 is a side elevation, with parts broken away, of a preferred embodiment of the ball and pin handling mechanism operatively mounted in the pit of a bowling alley.

The mechanism constituting the present invention is designed primarily for use with bowling pin spotting machines of the type disclosed in copending Holloway et al. application, Serial Number 150,232, filed March 17, 1950, for Bowling Pin Elevating Mechanism. It is to be noted, however, that this mechanism is not to be considered limited to such machines as it may find use in other types of bowling pin spotting machines.

Referring to the drawings, the ball and pin handling mechanism selected for purposes of illustration is shown located in the pit P of a conventional alley A. In the illustrated embodiment, there is provided an endless conveyor, such as endless belt 10 which is formed of any suitable material such as a rubber fabric or composition, leather, or other tough durable belt material. Conveyor belt 10 is substantially pit wide and extends longitudinally in pit P from a bowling object receiving position adjacent the header board or end of alley A to a discharge position at the rear of the pit.

Figure 2:
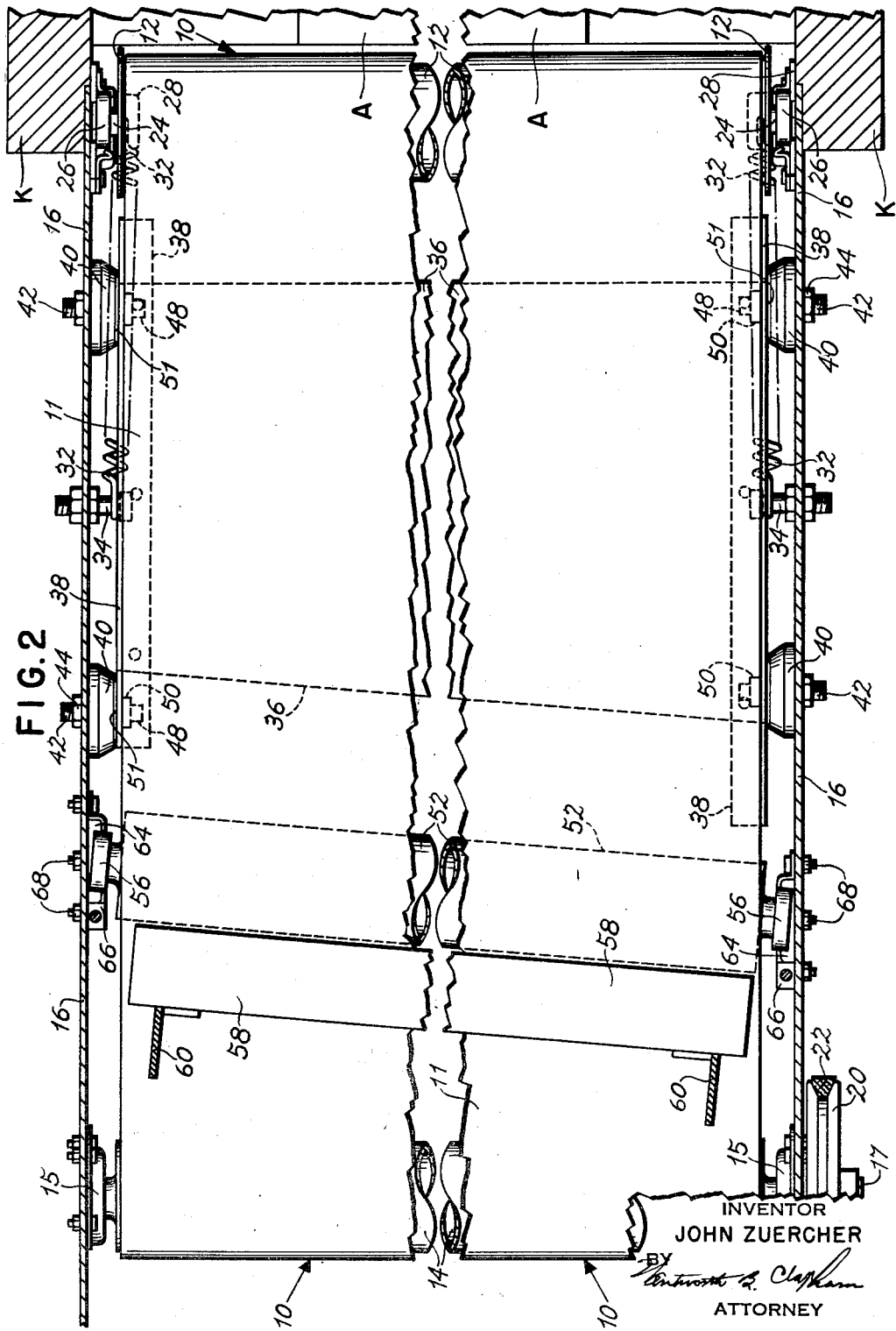
Fig. 2 is a plan view of the same.

As shown in Figs. 1 and 2, conveyor belt 10 extends beneath backstop or cushion 58. The backstop 58 is mounted on brackets 60 suitably supported on the frame (not shown) of a bowling pin spotting machine (not shown) with which the mechanism constituting the invention may be associated.

As indicated in Fig. 2, conveyor belt 10 runs on pulleys or rollers 12 and 14. The upper lap 11 of belt 10 forms a bowling pin and ball receiving and supporting surface moving rearwardly in pit P, preferably continuously, to convey pins and balls to the rear thereof. Driving roller 14 is mounted on a shaft 17 supported in suitable bearings 15 secured to the inner faces of plates 16 attached to and forming rearward extensions of conventional alley kickbacks K. Fixed to one end of shaft 17 is a pulley 20 on which runs a belt 22 continuously driven from a suitable driving shaft (not shown) of the pin spotting machine (not shown).

The ends of driven roller 12 are provided with suitable stud shafts 24 mounted in ring bearings 26. These bearings are floatingly supported in brackets 28. Each bracket 28 is pivoted on a stud 30 extending outwardly from the inner face of an adjacent upright supporting plate 16. The bottom edges of plates 16 are formed with inwardly directed flanges 18 (Fig. 3) by means of which plates 16 are attached firmly to the floor of pit P. Tension springs 32 hooked to the free ends of each bracket 28 and to studs 34 fastened to plates 16 bias roller 12 away from roller 14 and thereby provide sufficient tension to maintain the desired tautness on belt 10. Driven roller 12 preferably is of the self centering type. It may be similar in construction and operation to that disclosed in my copending application, Serial Number 315,861, filed October 21, 1952, for Self-Centering Roller. Since it does not form a specific part of the present invention, further showing and description herein are deemed unnecessary. The use of a self-centering roller 12 insures that belt 10 always will be maintained in proper operative relationship in pit P between plates 16. That is, the edges of belt 10 will always remain substantially parallel with plates 16 because of the operation of roller 12 which constantly tends to center belt 10. This action of roller 12 prevents excess wear of the edges of the belt.

Figure 3:
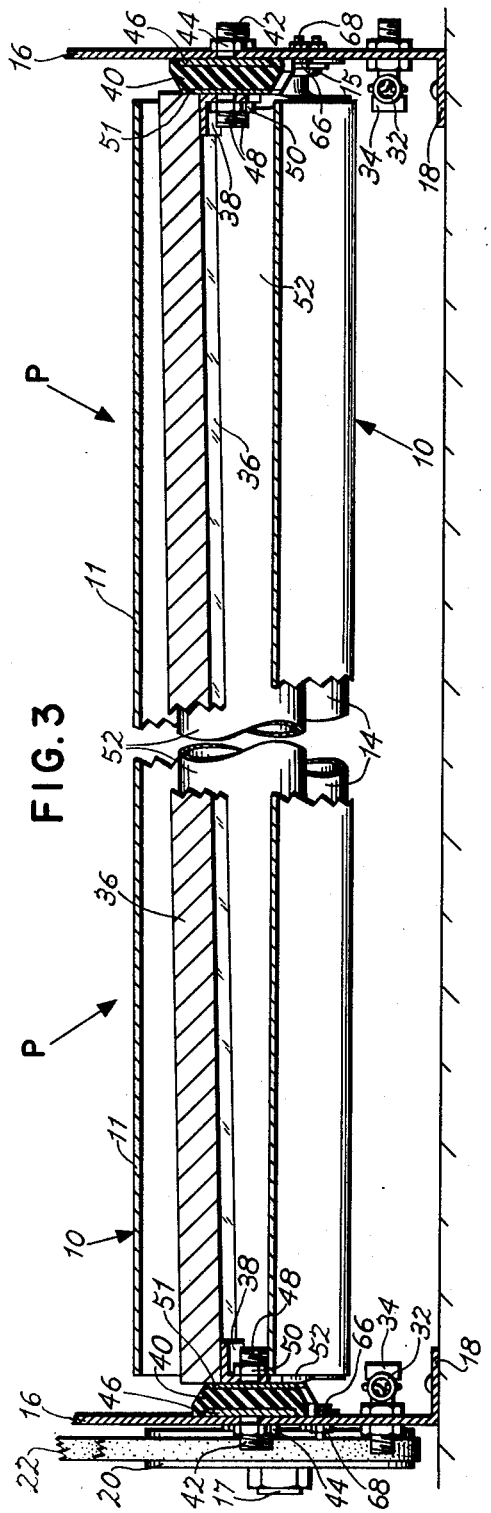
Fig. 3 is a sectional end elevation taken on line 3—3 in Fig. 1.
Figure 4:
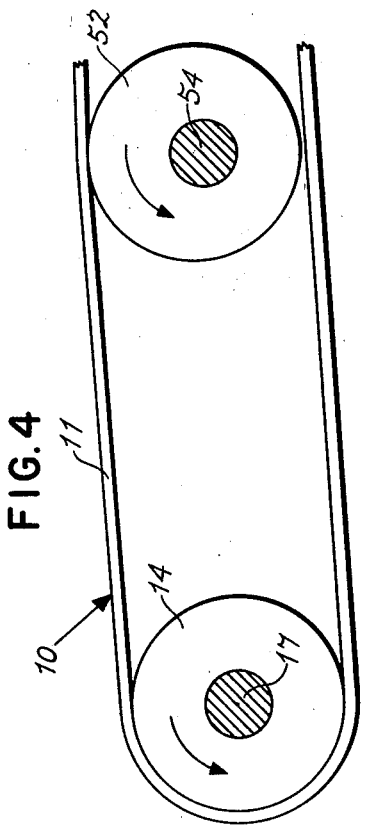
Fig. 4 is a partial sectional elevation illustrating diagrammatically the eccentric agitating roller located beneath and frictionally driven by the pin and ball conveyor in the pit of a bowling alley.

Located beneath lap 11 of conveyor 10 and extending across pit P between plates 16 is a buffer board 36. As shown in Figures 1, 2 and 3, buffer board 36 is resiliently supported by plates 16 and serves the purpose of absorbing the shock of impact of balls and pins dropping onto or striking against conveyor 10. Buffer board 36 may be formed of any suitable material such as plastic, wood, or laminated materials having sufficient rigidity and capacity to stand repeated impacts, and also absorb the sound created by such impacts. Buffer board 36 is of such width that it can provide substantial support means beneath belt lap 11 so that when pins and balls fall thereon, it will furnish a resilient support for the pins and balls on the lap 11 thereabove, thereby preventing excess wear and tear, splitting and deformation of conveyor 10 which might otherwise occur.

Referring to Fig. 3, it will be seen that attached to the under side of buffer board 36 at its ends are brackets 38. These brackets are secured to resilient bumpers, or rings 40, which in turn are attached to plates 16. Bumpers 40 are formed of any suitable resilient material such as rubber, natural or synthetic. Bumpers 40 are fastened to plates 16 by threaded studs 42 and nuts 44. Studs 42 have flanged heads 46 permanently attached to bumpers 40 as by vulcanization. Bumpers 40 are attached to brackets 38 by threaded studs 48 and nuts 50. Studs 48 have flanged heads 51 secured permanently to bumpers 40 in the same manner as flanged heads 46.

In the illustrated embodiment, bumpers 40 at one end of buffer board 36 are attached to plate 16, the right end as viewed in Fig. 3, at a higher elevation than at the other end. This arrangement inclines board 36 towards the left as well as to the rear of pit P, which assists the conveyor in directing balls towards the ball return mechanism (not shown), and pins towards pin handling means (not shown) at the rear of pit P. This construction along with the angular position of backstop 58 also aids in obtaining a rolling movement of a ball along the face of the backstop, the latter also being operative to separate a ball from pins moving on conveyor lap 11 rearwardly in pit P beneath backstop 58.

As mentioned hereinabove, an important feature of the invention is the provision of means associated with the conveyor 10 operative to rapidly raise and lower or agitate a selected portion of lap 11, thereby dislodging "sleepers" and also preventing jams of pins in pit P. "Sleepers" may be defined as pins lying on lap 11 of conveyor belt 10 alongside a kickback K or plate 16 and which tend to resist movement by lap 11 of conveyor belt 10 to the rear of the pit.

The preferred form of agitating device shown in the drawings consists of a resiliently mounted eccentric roller 52 located beneath lap 11 of conveyor 10 and between buffer board 36 and roller 14. Eccentric roller 52 is provided at its ends with stud shafts 54 mounted in ring bearings 56 which are held by clamps 62 detachably mounted in resilient blocks, such as rubber blocks 64 in housings 66 attached by bolts 68 to the inner faces of plates 16. One housing 66, that shown at the bottom of Fig. 2, is mounted on its supporting plate 16 at a lower elevation so that as in the case of buffer board 36, roller 52 is inclined slightly downwardly towards the ball return side of pit P. Bearings 56 are supported in housings 66 in such manner that eccentric roller 52 is substantially parallel with and in front of backstop 58. Eccentric roller 52 is driven continuously by frictional engagement with the underside of the top lap 11 of the conveyor belt 10. The eccentricity of roller 52 causes the portion of the lap 11 passing thereover and driving roller 52 to move rapidly up and down or to be agitated, which results in the securing of the novel results mentioned hereinabove.

Because of the slight inclination of the roller 52 downwardly in substantially the same direction as the inclination of buffer board 36, roller 52 also assists in directing a ball to the desired side of pit P. The rapid agitation breaks up "sleepers," and obviates pin jams which might block the ball from reaching the ball return mechanism (not shown), or cause breakage of parts of the machine (not shown), or otherwise interfere with the proper handling of pins.

Eccentric roller 52 also performs the function of expediting the delivery of some balls to a suitable ball removal device at the side of pit P. This is because balls rolling rearwardly along conveyor belt 10 and arriving on the portion of lap 11 extending between eccentric roller 52 and buffer board 36, tend to depress this portion and form a slight transverse pocket in which they roll laterally in front of eccentric roller 52 to the side of the alley towards which eccentric roller 52 and buffer board 36 are downwardly inclined. In this way the motion of a rolling ball is not changed appreciably because it does not strike backstop or cushion 58, but moves more rapidly to ball removal position.

Roller 52 is lightweight in construction, and because of its resilient mounting, has been found to be extremely effective in reducing to a minimum wear and tear of conveyor belt 10 caused by the impact of balls and pins. It also muffles the sound produced by the striking of balls and pins on conveyor belt 10. The easy removal features of the mounting of eccentric roller 52 are also beneficial from a service standpoint making possible easy removal and replacement or for repairs.

The invention above described may be varied in construction within the scope of the claims for the particular device, selected to illustrate the invention, is but one of many possible concrete embodiments of the same. It is not, therefore, to be restricted to the precise details of the structure shown and described.

What I claim is:

1. Ball and pin handling mechanism for use in the pit of a bowling alley comprising an endless conveyor having a substantially horizontal ball and pin supporting lap, driving and driven rollers operatively supporting said conveyor, a backstop located in said pit and mounted above said lap of said conveyor a distance less than the diameter of a bowling ball but greater than the maximum diameter of a bowling pin, means mounted beneath said lap of said conveyor for agitating said lap and so located that the upper lap of the conveyor is agitated at a point adjacent the backstop, means for moving said last-named means to agitate said lap and thereby insure the unobstructed movement of pins beneath said backstop to the rear of the pit, and downwardly inclined means associated with said conveyor and coacting with said backstop to cause a ball on said conveyor to roll towards a boundary of said pit while in engagement with said backstop.

2. Apparatus for use in the pit of a bowling alley for conveying and handling bowling pins and balls comprising an endless conveyor belt having a substantially horizontal bowling pin and ball supporting and conveying lap, means mounted above said lap and engaging a ball at a point above said lap of said conveyor for separating balls from pins and for causing a ball on said lap of said conveyor to be directed to one side of said pit while allowing pins to move unobstructedly past said separating means, a driving roller and a driven roller operatively supporting said belt, one of said rollers being provided with self-centering means for automatically centering said belt in said pit, means located beneath said supporting lap of said conveyor for agitating bowling pins carried thereby and preventing jams thereof against said separating means to insure the free movement of said pins past said separating means to the rear of said pit, and supports mounting said agitating means below said conveying lap of said belt between said driving and driven rollers to agitate said belt adjacent the point of separation of a ball from said pins.

3. The apparatus defined in claim 2 including a buffer board extending traversely of said pit beneath said lap of said belt, and resilient means mounting the ends of said buffer board for absorbing shock of impact of bowling objects striking said lap of said belt.

4. Apparatus in the pit of a bowling alley for conveying and handling bowling pins and balls, comprising an endless substantially horizontal supporting and conveying belt extending transversely of and longitudinally of said pit, said belt having an upper lap forming a rearwardly moving pin and ball supporting and conveying surface, a driven roller and a driving roller supporting said belt, a backstop mounted above said lap of said belt a distance greater than the maximum diameter of a bowling pin but less than the diameter of a bowling ball, whereby pins normally may pass therebeneath, an eccentric belt agitating roller located beneath said lap of said belt and below said backstop, said eccentric roller being rotated by frictional engagement with the undersurface of said lap for agitating said lap and breaking up any jams which might occur on said surface proximate said backstop, and means mounting said eccentric roller with its axis inclined downwardly from the plane of said lap of said belt and spaced from said backstop so as to direct a ball engaging said backstop to one side of said pit.

5. Apparatus for conveying and handling bowling pins and balls comprising a conveyor including an endless belt located in the pit of a bowling alley and extending laterally and longitudinally thereof, said belt having a lap forming a substantially horizontal rearwardly moving ball and pin supporting and conveying floor extending between a receiving position adjacent the end of said alley and a discharge position adjacent the rear of said pit, an angularly mounted backstop located above said lap, means mounting said backstop with the bottom thereof spaced from said lap a distance less than the diameter of a bowling ball and greater than the diameter of a bowling pin to restrict the movement of said ball therebeneath while permitting the passage of pins past said backstop, means for driving said conveyor rearwardly of said pit to travel bowling pins supported on said lap beneath said backstop, a transversely extending eccentric roller located beneath said lap of said conveyor, means supporting said roller below and adjacent said backstop with its longitudinal axis in a plane substantially parallel with the plane of said backstop and spaced therefrom to form a downwardly inclined guideway directing a ball to one side of said pit, and means for rotating said eccentric roller to move said roller into and out of engagement with the under side of said lap of said conveyor for raising and lowering portions of said lap of said conveyor passing thereover to agitate bowling pins supported on said floor and insure the unobstructed movement thereof by said moving floor beneath said backstop.

6. Ball and pin handling mechanism for use in the pit of a bowling alley comprising an endless conveyor belt having a substantially horizontal ball and pin supporting surface forming a rearwardly moving pit floor for moving pins and balls to the rear of said pit, a transversely extending backstop in said pit, means mounting said backstop with the bottom thereof spaced from said pit floor a distance less than the diameter of a bowling ball and greater than the diameter of a bowling pin, an eccentric roller located beneath said moving pit floor, means mounting said roller with its longitudinal axis lying in a plane substantially parallel with the plane of said backstop, said means including a support for one end of said roller positioning said end of said roller at a higher elevation than the other end thereof, said eccentric roller and said backstop being so spaced as to be operative in response to the engagement by a ball carried by said moving floor with said backstop to direct said ball to one side of said pit, means for driving said conveyor belt, means for rotating said eccentric roller to raise and lower pins on said moving floor adjacent said eccentric roller to insure the free movement of pins beneath said backstop to the rear of said pit, and a resiliently mounted buffer board located beneath said pit floor between the end of said alley and said eccentric roller for absorbing the shock of impact of bowling balls and pins dropping into said pit and onto said moving floor.

7. Ball and pin handling mechanism for use in the pit of a bowling alley comprising a flexible bowling object supporting and conveying surface forming a rearwardly moving pit floor, a transversely extending backstop located above said moving pit floor, an agitating device located beneath said moving pit floor, means mounting said backstop a distance above said moving pit floor sufficient to allow pins only to be carried beneath said backstop, means supporting said agitating device to form with said backstop a downwardly inclined guideway such that in response to the engagement of a ball on said conveying surface with said backstop said ball is diverted to one side of said pit, means for driving said supporting and conveying surface, means for operating said agitating device to raise and lower portions of said moving pit floor adjacent said backstop to insure the unobstructed movement of bowling pins past said backstop, and means located beneath said pit floor for absorbing the shock of impact of bowling objects striking said moving pit floor.

8. Apparatus for use in the pit of a bowling alley for conveying and handling bowling balls and pins, comprising an endless supporting and conveying belt extending longitudinally in and transversely of the pit of said alley, said belt having a lap forming a substantially horizontal rearwardly moving pin and ball supporting and conveying surface, means for driving said belt, a backstop in said pit, means mounting said backstop above said belt with the lower edge thereof spaced from said belt a distance less than the diameter of a ball and greater than the maximum diameter of a bowling pin, means for raising and lowering a limited portion of said lap adjacent said backstop to prevent jams of pins between said backstop and said surface and thereby insure a free and unobstructed movement of bowling pins beneath said backstop to the rear of said pit, and supports mounting said last-named means for coaction with said backstop to divert a ball engaging said backstop to a boundary of said pit.

References Cited in the file of this patent
UNITED STATES PATENTS

| | | |
|---|---|---|
| 1,190,649 | Hedenskoog | July 11, 1916 |
| 1,692,796 | Bishop | Nov. 20, 1928 |
| 1,896,383 | White | Feb. 7, 1933 |
| 2,388,708 | Bates | Nov. 13, 1945 |
| 2,570,367 | Mitten | Oct. 9, 1951 |
| 2,591,265 | Johns et al. | Apr. 1, 1952 |
| 2,626,802 | Simpson | Jan. 27, 1953 |

FOREIGN PATENTS

| | | |
|---|---|---|
| 532,265 | Great Britain | Jan. 21, 1941 |